Figure 1:
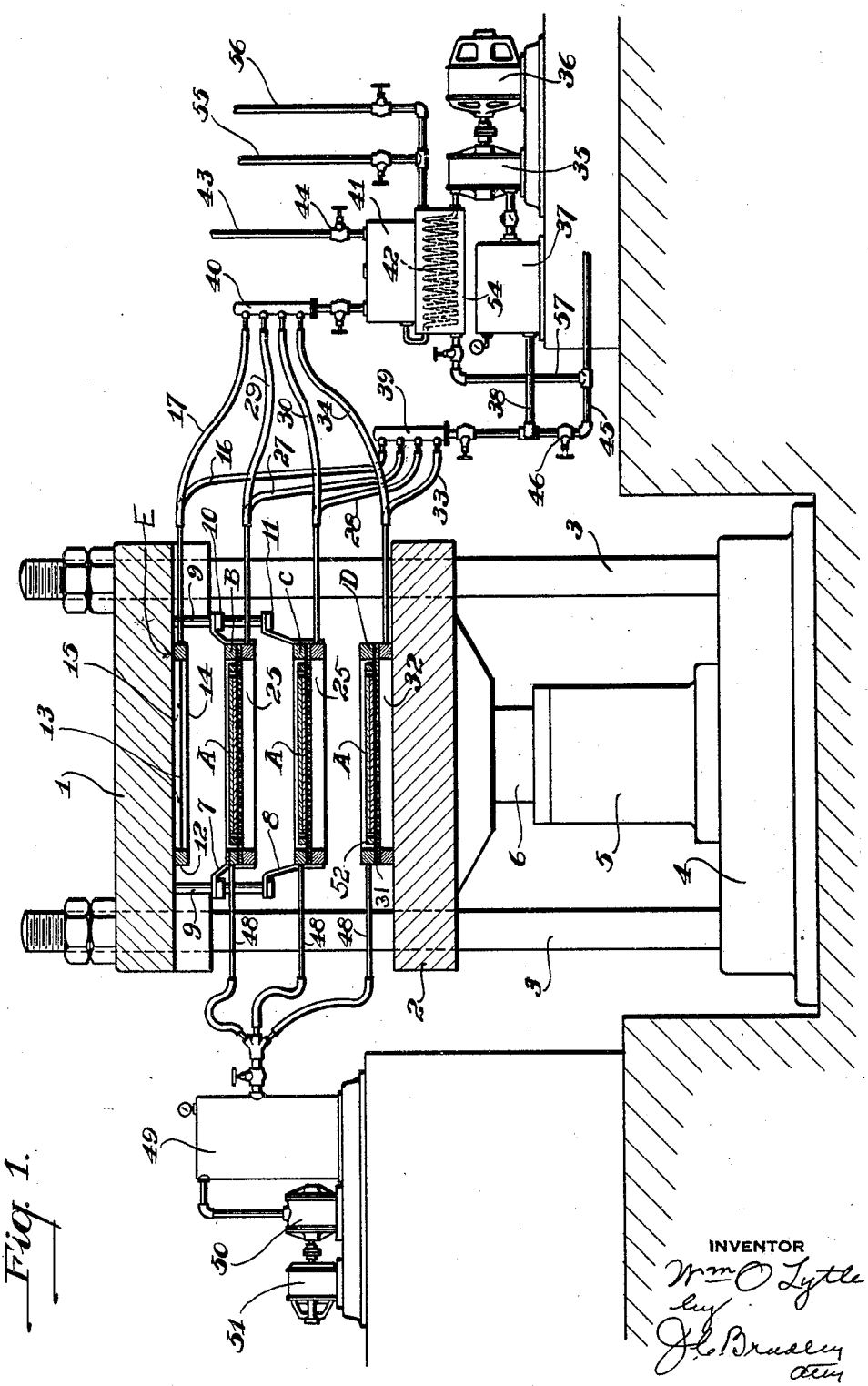

Feb. 9, 1932. W. O. LYTLE 1,844,098
APPARATUS FOR MAKING COMPOSITE GLASS
Filed Jan. 29, 1927 3 Sheets-Sheet 1

INVENTOR
Wm O Lytle
by
J. C. Bradley
atty

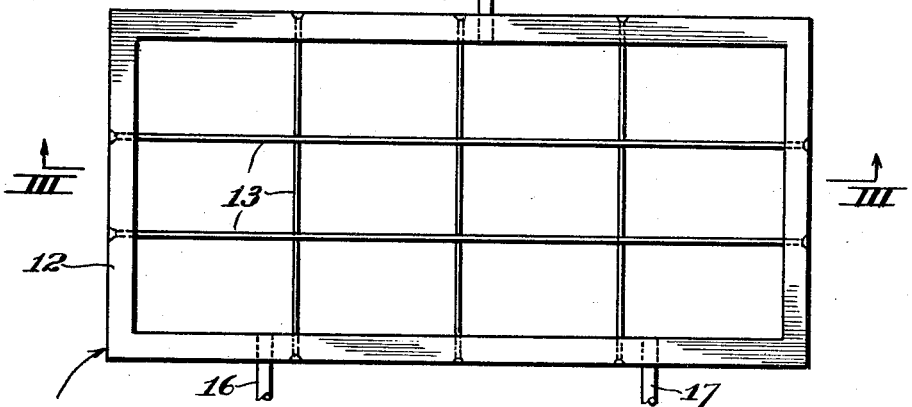
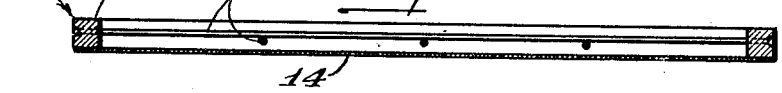
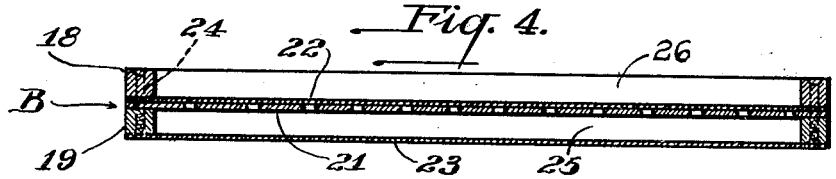
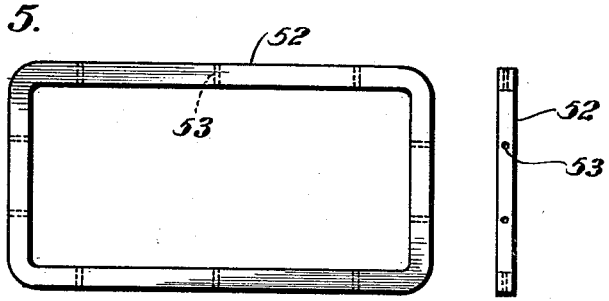
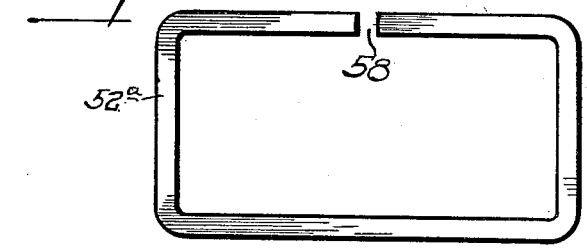

Feb. 9, 1932.  W. O. LYTLE  1,844,098
APPARATUS FOR MAKING COMPOSITE GLASS
Filed Jan. 29, 1927   3 Sheets-Sheet 3
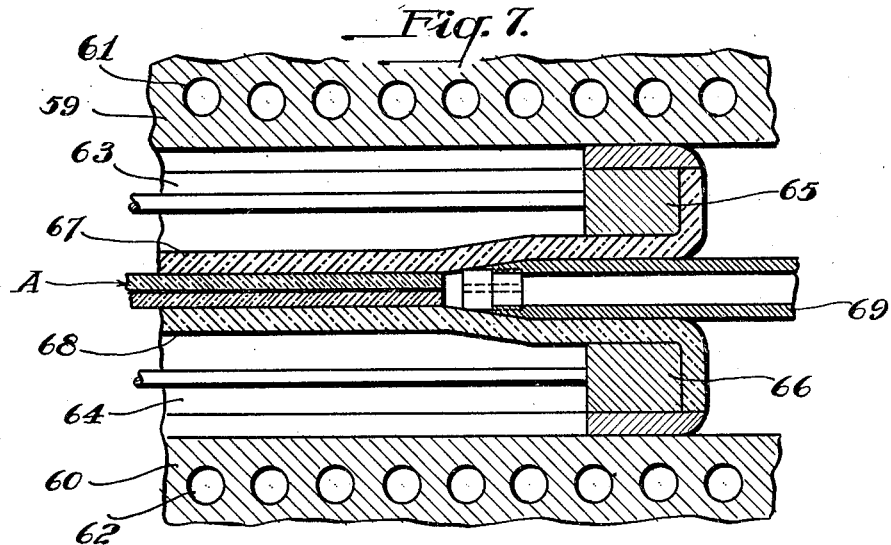
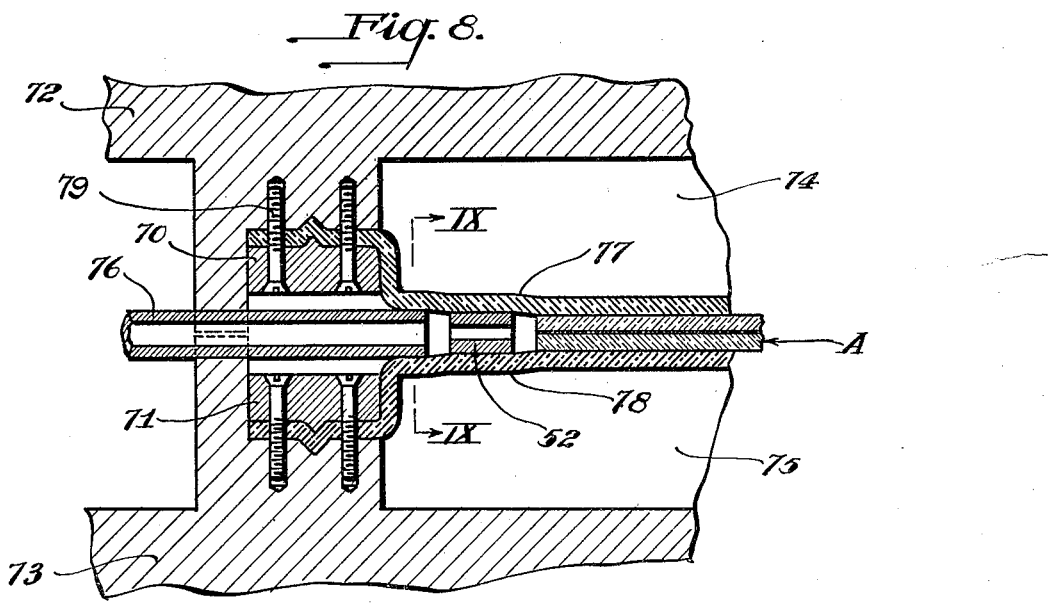
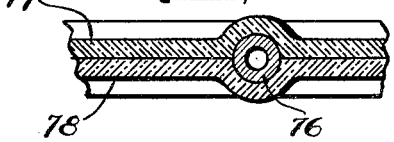

Patented Feb. 9, 1932

1,844,098

UNITED STATES PATENT OFFICE

WILLIAM ORLAND LYTLE, OF NEW KENSINGTON, PENNSYLVANIA, ASSIGNOR TO PITTSBURGH PLATE GLASS COMPANY, A CORPORATION OF PENNSYLVANIA

APPARATUS FOR MAKING COMPOSITE GLASS

Application filed January 29, 1927. Serial No. 164,511.

The invention relates to an apparatus for making composite glass, and particularly to the means for applying heat and pressure to cause the joinder between the glass and celluloid. Composite glass ordinarily comprises two sheets of glass with a sheet of celluloid cemented therebetween, although a greater or less number of layers of material may be employed. It is preferred to assemble the sheets with a coating of cement, such as gelatin, dried upon the surfaces of the glass sheets, which are to be cemented to the celluloid, the heat subsequently applied to the assembled sheets serving to soften the gelatin and secure adhesion when pressure is applied, but it will be understood that the apparatus may be used in other ways. For instance, a sufficient amount of heat and pressure will cause the adherence of the celluloid to the glass without the use of any cement, and the invention may be employed in such way, if desired. Heretofore, it has been the practice to assemble the set of sheets to be joined in a rubber bag or container, which is then placed in a tank and exposed to hydraulic pressure, the interior of the bag being open to the atmosphere, and the liquid which applies the pressure being heated to soften the gelatin. The object of the present apparatus is to provide a more convenient means for carrying out this procedure, so that the labor involved is less and the time required is reduced. This is accomplished by substituting for the rubber bags, pairs of rubber diaphragms between which the sets of plates to be joined are placed, and by providing for a multiple pressing and heating operation. Certain embodiments of the invention are illustrated in the accompanying drawings, wherein:

Figure 1 is a vertical section through one form of the apparatus. Figs. 2 and 3 are plan and sectional views through one of the frames employed, Fig. 3 being a section on the line III—III of Fig. 2. Fig. 4 is a longitudinal section through another of the frame members. Figs. 5 and 6 are plan views of two different forms of templet which may be employed. Fig. 7 is a section through a part of a modified construction. And Figs. 8 and 9 are sections through another modification, Fig. 9 being a section on the line IX—IX of Fig. 8.

In carrying out the operation with the apparatus of Fig. 1, the three sets of sheets A, A, A are placed in position upon the frames B, C and D, shown in Fig. 1. Each of these sets of sheets comprises a pair of glass sheets with the celluloid sheet therebetween, the glass sheets having their inner faces coated with a thin film of gelatin which has dried thereon and which is to act as the cement for holding the three sheets together. The press comprises the fixed platen 1, the movable platen 2, the guide posts 3, the base 4, and the hydraulic cylinder and plunger 5 and 6. The frames B and C are provided with brackets 7 and 8 whose ends slidably engage the posts 9, and the posts 9 are provided with the collars 10 and 11 which act as stops for the brackets. When the platen 2 is moved down to the position shown in Fig. 1, the frames separate by gravity and occupy the position shown, the frame B at such time lying below a fourth frame E, which is secured to the fixed platen 1.

The frame E is constructed as shown in Figs. 2 and 3 and comprises a rectangular steel member 12 reinforced by the plurality of transverse rods 13, and to the lower face of this frame member is secured a flexible diaphragm 14, preferably of rubber. The diaphragm may be secured to the frame by vulcanizing its edge portions to the lower face of the frame. A chamber 15 is thus provided between the diaphragm and the platen 1 and to this chamber are connected the inlet pipe 16 and the exhaust pipe 17.

The frames B and C are constructed, as indicated in Fig. 4, such frames comprising rectangular steel members 18 and 19 with a perforated steel plate 21 lying therebetween. This frame carries two rubber diaphragms 22 and 23, the diaphragm 22 lying upon and being supported by the perforated plate 21, such plate also acting as a reinforcing means for the members 18 and 19 and taking the place of the rods 13 as used in the frame E. The diaphragms may be vulcanized at their edges to the members 18 and 19 and such members are securely clamped together by means of screws 24. Chambers 25 and 25 are thus provided in the frame members, and such chambers are provided with the inlet pipes 27 and 28 and the exhaust pipes 29 and 30. The frame D is similar to the frames B and C, except that this frame has only the single rubber diaphragm 31, the frame being secured to the platen 2 so that the chamber 32 is provided between the diaphragm and the platen. This chamber is provided with an inlet pipe 33 and an exhaust pipe 34. Hydraulic pressure is supplied through the inlet pipes 16, 27, 28 and 33 to the chambers 15, 25, 25 and 32 by means of the pump 35 operated by the motor 36 which forces water through the tank 37 and the pipe 38 to the header 39. The inlet to the pump is supplied from the exhaust pipes 17, 29, 30 and 34 via the header 40, the drain tank 41, and the coil 42. Additional water may be supplied from the pipe 43 provided with a valve 44, and the water may be drained from the chambers 15, 25, 25 and 32 by means of the drain pipe 45, the valve 46 being open at this time. The spaces above the rubber diaphragms which carry the sets of sheets A, A, A are exhausted by means of the pipes 48, 48, 48 leading to the vacuum tank 49, the exhaust of such tank being accomplished by means of the pump 50 driven by the motor 51. The templets 52, shown in Fig. 5, may also be employed around the sets of sheets A, A, A, as indicated in Fig. 1, such templets having perforations 53 through their side walls and serving to prevent the rubber diaphragms from applying excessive pressure to the edges of the glass, which might otherwise cause breakage and tend to squeeze out the celluloid. The water which flows through the coil 42 may be either heated or cooled by fluid supplied to the tank 54 through the cold water pipe 55 or the steam pipe 56, such tank 54 having an outlet pipe 57.

In operation, the sets of plates A, A, A are positioned as indicated in Fig. 1, and fluid pressure is applied to the cylinder 5 to raise the platen 2 and clamp the frames E, B, C and D tightly together so that each of the sets of sheets lies between a pair of rubber diaphragms from between which the air may be exhausted through the pipes 48. The pump 35 is now started and water is circulated through the chambers 15, 25, 25 and 32, such water being heated in the coil 42 by means of steam from the pipe 56, the valve in the cold water pipe 55 being closed at this time. This circulation continues until the water reaches a temperature of about 250 deg. F., the speed of operation of the pump 35 being so regulated that the pressure in the chambers 15, 25, 25 and 32 is approximately 150 lbs. per square inch. The sets of sheets A, A, A are thus pressed tightly into contact and heated to a point which softens the gelatin so that it may become effective as a cement. The sheets must now be cooled down under pressure and this is accomplished by shutting off the supply of steam through the pipe 56 and opening the valve in the cold water pipe 55, so that cold water is circulated through the tank 54. The water which is being thus circulated under pressure is in this manner cooled and the temperature of the sheets A, A, A is rapidly reduced to a point where they may be conveniently handled when the press is opened. When this cooling down operation is complete, the pump 35 is stopped and the water is partially drained from the chambers 15, 25, 25 and 32 by opening the valve 46. When these chambers are drained, the press may be opened and the sets of composite plates removed, this being accomplished by releasing the pressure in the cylinder 5 and permitting the platen 2 to move down to the position indicated in Fig. 1. This completes the cycle and new sets of sheets to be joined may be again positioned in the press and the operation repeated. The use of the exhaust pipes 48, 48, 48 facilitates the removal of any air which may be trapped between the glass sheets and the celluloid.

Fig. 6 shows a modified form of templet, wherein the templet 52a is split, as indicated at 58, to permit the passage of air, such space 58 taking the place of the perforations 53 in the Fig. 5 construction.

Fig. 7 illustrates a modification wherein the platens 59 and 60 of the press are provided with circulation passages 61 and 62 through which steam or cold water may be circulated in order to heat or cool the liquid in the chambers 63 and 64. The rectangular frame members 65 and 66 are carried directly by the two platens being partially surrounded by the edges of the rubber diaphragms 67 and 68, which act as a packing means for the joints between the frames and the platens. A pipe 69 performs the function of the pipes 48 in the Fig. 1 construction, such pipe fitting in notches formed in the opposing faces of the frame members 65 and 66, the rubber diaphragms fitting around this pipe and making a tight joint. With this form of apparatus, the water which is supplied to the chambers 63 and 64 is not heated and cooled by the circulation process heretofore described in connection with Fig. 1, but such water is heated and cooled from the platens 59 and 60. To heat these platens during the first part of the operation, steam is circulated through the pipes 61 and 62 until the water in the chambers 63 and 64 reaches a temperature of about 250 degrees. This water is then cooled by circulating cold water through the passages 61 and 62, such circulation continuing until the water in the chambers 63 and 64 drops to a point such that the set of plates A is cooled so that it may be easily handled.

Figs. 8 and 9 illustrate a further modification in which the frame members 70 and 71 are set into the platens 72 and 73 and secured by means of the stud bolts 79. In this construction, the hydraulic pressure is applied to the chambers 74 and 75 and an exhaust is secured from between the sheets of the set A by means of the pipe 76 which fits between the diaphragms, as indicated in Fig. 9. As in the other form of construction, the templet 52 supports the diaphragms 77 and 78 between the frames 70 and 71 and the edges of the glass sheets so that the diaphragms are not pressed in too sharply at this point. The frames 70 and 71 serve to clamp the edges of the diaphragms to the platens 72 and 73. The water in the chambers 74 and 75 may be heated and cooled either by the circulation arrangement of Fig. 1 or by the arrangement of Fig. 7. While the diaphragms are shown and described as rubber, it will be understood that the invention is not limited to the use of rubber diaphragms and that the term "flexible diaphragm" is applicable to any form of diaphragm which has sufficient flexibility to give under hydraulic pressure and apply the necessary pressure to the composite sheet. For instance, thin sheet metal has the requisite flexibility and may be used in place of rubber.

What I claim is:

1. Apparatus for applying pressure to a plurality of sheets to be joined together, comprising a pair of opposing frame members, one of which is movable toward and from the other, and each provided with outwardly opening chambers, a flexible diaphragm seated across the open face of each chamber constituting a closure therefor, means for supplying fluid under pressure to each of said chambers, the said diaphragms being adapted to receive between them the sheets to be joined together, and spacing means adapted to surround the plurality of sheets and lying between the edges of such sheets and the inner edges of the frame members, said spacing means having approximately the same thickness as the combined thickness of the sheets.

2. Apparatus for applying pressure to a plurality of sheets to be joined together, comprising a pair of opposing frame members, one of which is movable toward and from the other, and each provided with outwardly opening chambers, a flexible diaphragm seated across the open face of each chamber constituting a closure therefor, means for clamping said frames together, with the sheets to be joined between the diaphragms, spacing means adapted to surround the plurality of sheets and lying between the edges of such sheets and the inner edges of the frame members, said spacing means having approximately the same thickness as the combined thickness of the sheets and means for applying fluid under pressure to each of said chambers.

3. Apparatus for applying pressure to a plurality of sets of sheets to form each set into a composite plate, comprising a press having a pair of opposing platens, one of which is movable toward the other, a series of pairs of separable opposing diaphragms of flexible material with a pressure chamber to the rear of each lying between said platens, means for supporting the diaphragms in spaced relation when the platens are separated, and means for applying fluid pressure to all of said chambers.

4. Apparatus for applying pressure to a plurality of sets of sheets to form each set into a composite plate, comprising a press having a pair of opposing platens, one of which is movable toward the other, a flexible diaphragm carried by each platen with a fluid pressure chamber to the rear thereof, a plurality of frames mounted for movement between the platens and each comprising a pair of flexible diaphragms with a pressure chamber therebetween, and means for applying fluid pressure to all of said chambers.

5. Apparatus for applying pressure to a plurality of sets of sheets to form each set into a composite plate, comprising a press having a pair of opposing platens, one of which is movable toward the other, a flexible diaphragm carried by each platen with a fluid pressure chamber to the rear thereof, a plurality of frames mounted for movement between the platens and each comprising a pair of flexible diaphragms with a pressure chamber therebetween, means for supporting said frames in spaced relation when the platens are separated, and means for applying fluid pressure to all of said chambers.

6. Apparatus for applying pressure to a plurality of sheets to be joined together, comprising a pair of opposing frame members, one of which is movable toward and from the other, and each provided with outwardly opening chambers, a flexible diaphragm seated across the open face of each chamber constituting a closure therefor, means for supplying fluid under pressure to each of said chambers, the said diaphragms being adapted to receive between them the sheets to be joined together, and a templet or frame adapted to surround the plurality of sheets and lying between the edges of such sheets and the inner edges of the frame members.

7. Apparatus for applying pressure to a plurality of sheets to be joined together, comprising a pair of opposing frame members, one of which is movable toward and from the other, and each provided with outwardly opening chambers, a flexible diaphragm seated across the open face of each chamber constituting a closure therefor, means for supplying fluid under pressure to each of said chambers, the said diaphragms being adapted to receive between them the sheets to be joined together, and a templet or frame adapted to surround the plurality of sheets and lying between the edges of such sheets and the inner edges of the frame members, said templet or frame having approximately the same thickness as the combined thickness of the plates.

8. Apparatus for applying pressure to a plurality of sheets to be joined together comprising an enclosing means for the sheets having opposing flexible sides, means for applying hydraulic pressure to said sides to press them toward each other, and spacing means between said sides surrounding the plurality of sheets in proximity to the edges thereof and having approximately the same thickness as the combined thickness of the sheets.

9. Apparatus for applying pressure to a series of sets of sheets to form each set into a composite plate comprising a press having a pair of opposing platens, one of which is movable toward and from the other, a plurality of hollow frame members lying in series between the platens movable therebetween and adapted to be clamped by the platens when they approach, a supporting plate forming the closure of one side of each of said frame members, a flexible diaphragm constituting the closure of the other side of each of said frame members, and means for applying fluid pressure to the space inside said frame members between the supporting plates and the diaphragms.

10. Apparatus for applying pressure to a plurality of sheets to be joined together comprising a supporting plate for the assembled sheets, a rubber diaphragm in opposition to the plate, a support for the diaphragm having a fluid receiving space back of such diaphragm, a removable spacing frame seated on said plate surrounding said sheets and having a thickness substantially equal to the combined thickness of the sheets, and means for supplying fluid under pressure to said fluid receiving space.

In testimony whereof, I have hereunto subscribed my name this 15th day of January, 1927.

W. ORLAND LYTLE.